(12) United States Patent
Chen et al.

(10) Patent No.: US 11,244,444 B2
(45) Date of Patent: Feb. 8, 2022

(54) METHOD AND APPARATUS FOR ANALYZING SEMICONDUCTOR WAFER

(71) Applicant: Shanghai Huali Microelectronics Corporation, Shanghai (CN)

(72) Inventors: Xiao Chen, Shanghai (CN); Jianye Song, Shanghai (CN); Guangzhi He, Shanghai (CN)

(73) Assignee: Shanghai Huali Integrated Circuit Mfg. Co. Ltd., Shanghai (CN)

( * ) Notice: Subject to any disclaimer, the term of this patent is extended or adjusted under 35 U.S.C. 154(b) by 191 days.

(21) Appl. No.: 16/681,843

(22) Filed: Nov. 13, 2019

(65) Prior Publication Data

US 2020/0211168 A1    Jul. 2, 2020

(30) Foreign Application Priority Data

Dec. 29, 2018    (CN) .......................... 201811636763.X

(51) Int. Cl.
*G06T 7/00*    (2017.01)
*G06T 19/20*    (2011.01)

(52) U.S. Cl.
CPC .............. *G06T 7/001* (2013.01); *G06T 19/20* (2013.01); *G06T 2207/20056* (2013.01); *G06T 2207/30148* (2013.01); *G06T 2219/2016* (2013.01)

(58) Field of Classification Search
CPC . G06T 7/001; G06T 19/20; G06T 2219/2016; G06T 2207/20021; G06T 2207/30148; G06T 2207/20056
See application file for complete search history.

(56) References Cited

U.S. PATENT DOCUMENTS

| | | | |
|---|---|---|---|
| 9,843,596 B1* | 12/2017 | Averbuch | G06F 21/552 |
| 2004/0105093 A1* | 6/2004 | Hamamatsu | G01N 21/9501 356/237.4 |
| 2008/0058978 A1* | 3/2008 | Cain | G06F 30/20 700/121 |
| 2015/0268177 A1* | 9/2015 | Yokochi | G01N 21/9501 356/237.5 |
| 2018/0103247 A1* | 4/2018 | Kolchin | H04N 13/254 |
| 2019/0355601 A1* | 11/2019 | Danen | H01L 21/67288 |

* cited by examiner

*Primary Examiner* — Siamak Harandi
(74) *Attorney, Agent, or Firm* — Adsero IP

(57) ABSTRACT

The present invention provides a method and apparatus for analyzing a semiconductor wafer for analyzing a defect distribution pattern on a semiconductor wafer to be tested. The method comprises: obtaining a defect distribution map of the semiconductor wafer to be tested, the defect distribution map indicating a defect distribution within a surface of the semiconductor wafer to be tested; establishing a three-dimensional model to be tested according to the defect distribution map, wherein an XY plane of the three-dimensional model to be tested corresponds to the surface of the semiconductor wafer to be tested, and a Z-axis of the three-dimensional model to be tested corresponds to the number of defects in each grid unit in the XY plane.

19 Claims, 12 Drawing Sheets

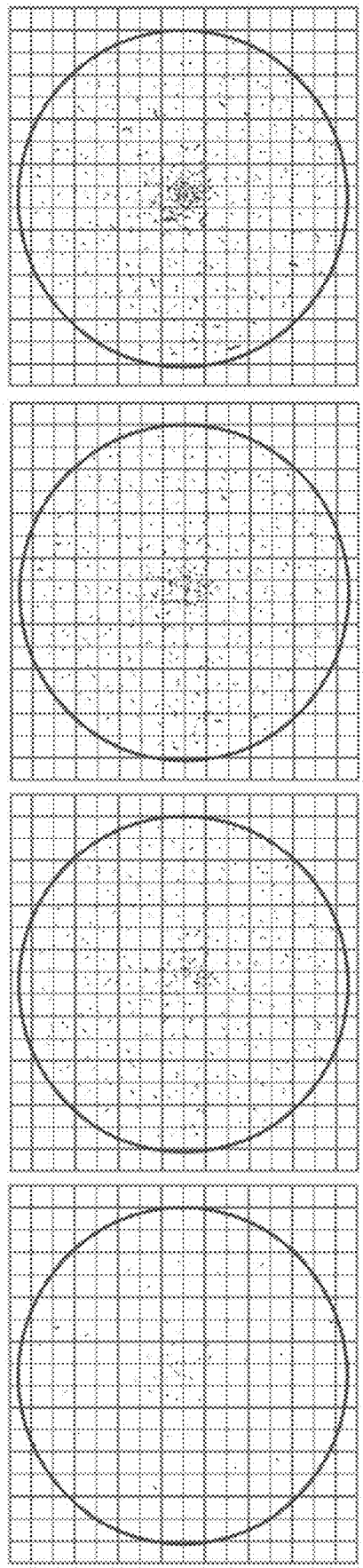

METHOD AND APPARATUS FOR ANALYZING SEMICONDUCTOR WAFER

CROSS-REFERENCES TO RELATED APPLICATIONS

The present application claims priority to Chinese Patent Application No. 201811636763.X, filed on Dec. 29, 2018, entitled "Method and apparatus for analyzing semiconductor wafer", which is incorporated by reference herein for all purposes.

FIELD

The invention relates to the field of defect analysis, in particular to defect analysis of semiconductor wafers and monitoring and early warning thereof.

BACKGROUND

Defect monitoring and defect analysis have always been indispensable parts of the semiconductor process. Especially in the process of large integrated circuit wafer production, monitoring the defect problem generated in the process at each process node is a necessary means to control the improvement of yield. In other words, how to accurately screen defective semiconductor wafers from a large number of semiconductor wafers is a prerequisite for ensuring subsequent defect analysis and control to improve yield.

At present, the industry mainly relies on the defect number threshold alarm for online defect monitoring. With the gradual development of the semiconductor manufacturing process, the absolute number of defects has been well controlled. Therefore, relying solely on the defect number threshold alarm cannot effectively screens out the defective semiconductor wafers.

Furthermore, due to its specific machine structures or special process operations, different processes may cause special or regular distribution of defects. For example, in a defect detecting process of a dry etching process, since the machine structure has inherent defects, inevitably accumulate polymer deposited during the long-term dry etching process on certain fixed parts above the cavity. If these polymers are dropped on the wafer being worked on, the wafers that are being worked on will be incompletely dried, some of the patterns cannot be etched successfully, and a special distributed defect wafer is formed. Due to the different number of drops, the number of defects will vary to different extents. Large differences in the number of defects make it difficult to monitor the above defects.

For such special distribution defects, the advanced approach in current industry is to generate surface defect maps for semiconductor wafers and to intelligently identify images by similar or simulated face recognition. This method mainly identifies the similar defect maps by grasping and comparing the feature points. This kind of intelligent picture recognition method has a higher recognition rate for a serious or very typical special distributed defect wafer map, it is not possible to accurately identify types that have a small interception or a large variation in the area of the defect.

In view of this, there is a need for a method and apparatus for analyzing semiconductor wafers, which are capable of intelligently classifying and identifying different numbers of defects exhibiting various distributions on different semiconductor wafers, and performing alarm interception or unified classification analysis the defects to finally achieve the long-term effective monitoring and analysis of surface defects of semiconductor wafers.

SUMMARY

A brief summary on one or more aspects is given below to provide the basic understanding for these aspects. This summary is not an exhaustive overview of all the contemplated aspects and is neither intended to indicate critical or decisive elements of all aspects nor to attempt to define the scope of any or all aspects. Its sole purpose is to present some concepts of one or more aspects in a simplified form as a preface for a more detailed description presented later.

As described above, in order to solve the problem that the prior art cannot effectively monitor and analyze various defects of different numbers and different distribution situations, the invention provides a method of analyzing a semiconductor wafer for analyzing a defect distribution pattern on a semiconductor wafer to be tested, the method comprising:

obtaining a defect distribution map of the semiconductor wafer to be tested, the defect distribution map indicating a defect distribution within a surface of the semiconductor wafer to be tested;

establishing a three-dimensional model to be tested according to the defect distribution map, wherein an XY plane of the three-dimensional model to be tested corresponds to the surface of the semiconductor wafer to be tested, and a Z-axis of the three-dimensional model to be tested corresponds to the number of defects in each grid unit in the XY plane; and calculating a similarity between the three-dimensional model to be tested and at least one three-dimensional reference model to determine a defect distribution pattern of the semiconductor wafer to be tested, wherein each three-dimensional reference model indicates a pattern of defect distribution.

In the above embodiments, the method further comprises: adjusting the three-dimensional model to be tested to obtain an adjusted three-dimensional model to be tested; and calculating the similarity further includes calculating a similarity between the adjusted three-dimensional model to be tested and the at least one three-dimensional reference model to determine the defect distribution pattern of the semiconductor wafer to be tested.

In the above embodiments, the adjusting the three-dimensional model to be tested further comprises: normalizing the number of defects in each grid unit in the XY plane to obtain the Z-axis adjusted three-dimensional model to be tested.

In the above embodiments, the adjusting the three-dimensional model to be tested further comprises: Fourier transforming the number of defects in each grid unit in the XY plane to obtain the Z-axis adjusted three-dimensional model to be tested.

In the above embodiments, the adjusting the three-dimensional model to be tested further comprises:

in response to the number of grid units of the XY plane of the three-dimensional model to be tested being inconsistent with the number of grid units of the XY plane of the at least one three-dimensional reference model, re-gridding the XY plane of the three-dimensional model to be tested according to the number of grid units of the XY plane of the at least one three-dimensional reference model to obtain the XY plane adjusted three-dimensional model to be tested.

In the above embodiments, the adjusting the three-dimensional model to be tested further comprises: rotating the three-dimensional model to be tested multiple times around the Z-axis;

the computing further comprises, for each of the at least one three-dimensional reference model, calculating the similarity between the three-dimensional reference model and the three-dimensional model to be tested after each rotation, wherein the highest similarity is the similarity between the three-dimensional model to be tested and the three-dimensional reference model.

In the above embodiments, the at least one three-dimensional reference model comprises a plurality of three-dimensional reference models; the method further comprises:

calculating a similarity between each of the three-dimensional reference models and the three-dimensional model to be tested; and the defect distribution pattern of the semiconductor wafer to be tested is determined to be a defect distribution pattern indicated by the three-dimensional reference model corresponding to the highest similarity in response to the highest similarity among the obtained plurality of similarities being higher than a preset threshold.

In the above embodiments, the method further comprises: establishing the at least one three-dimensional reference model.

In the above embodiments, the establishing further comprises:

obtaining distribution maps of a plurality of semiconductor wafer samples;

establishing a plurality of three-dimensional sample models based on defect distribution maps of the plurality of semiconductor wafer samples;

classifying the plurality of three-dimensional sample models into at least one category according to a degree of similarity between the plurality of three-dimensional sample models, and the three-dimensional sample models included in a same category indicate a same defect distribution pattern; and selecting any one three-dimensional sample model in the same category as the three-dimensional reference model for that category.

In the above embodiments, when it is determined that the defect distribution of the semiconductor wafer to be tested is a defect distribution pattern indicated by the at least one three-dimensional reference model, the method further comprises:

marking the semiconductor wafer to be tested, and/or further analyzing the cause of the defect of the semiconductor wafer to be tested.

The invention also provides an apparatus for analyzing a semiconductor wafer for performing a method of analyzing a semiconductor wafer for analyzing a defect distribution pattern on a semiconductor wafer to be tested, the apparatus comprising a processor and a memory having a database stored therein, wherein at least one three-dimensional reference model is stored in the database, and each three-dimensional reference model indicates a pattern of defect distribution;

the processor is configured to: obtain a defect distribution map of the semiconductor wafer to be tested, the defect distribution map indicating a defect distribution within a surface of the semiconductor wafer to be tested;

establish a three-dimensional model to be tested according to the defect distribution map, wherein an XY plane of the three-dimensional model to be tested corresponds to the surface of the semiconductor wafer to be tested, and a Z-axis of the three-dimensional model to be tested corresponds to the number of defects in each grid unit in the XY plane; and calculate a similarity between the three-dimensional model to be tested and the at least one three-dimensional reference model to determine a defect distribution pattern of the semiconductor wafer to be tested.

In the above embodiments, the processor is further configured to: adjust the three-dimensional model to be tested to obtain an adjusted three-dimensional model to be tested; and calculate a similarity between the adjusted three-dimensional model to be tested and the at least one three-dimensional reference model to determine a defect distribution pattern of the semiconductor wafer to be tested.

In the above embodiments, the processor is further configured to: normalize the number of defects in each grid unit in the XY plane to obtain the Z-axis adjusted three-dimensional model to be tested.

In the above embodiments, the processor is further configured to: Fourier transforming the number of defects in each grid unit in the XY plane to obtain the Z-axis adjusted three-dimensional model to be tested.

In the above embodiments, the processor is further configured to:

in response to the number of grid units of the XY plane of the three-dimensional model to be tested being inconsistent with the number of grid units of the XY plane of the at least one three-dimensional reference model, re-grid the XY plane of the three-dimensional model to be tested according to the number of grid units of the XY plane of the at least one three-dimensional reference model to obtain the XY plane adjusted three-dimensional model to be tested.

In the above embodiments, the processor is further configured to: rotate the three-dimensional model to be tested multiple times around the Z-axis;

for each of the at least one three-dimensional reference model, calculate the similarity between the three-dimensional reference model and the three-dimensional model to be tested after each rotation, wherein the highest similarity is the similarity between the three-dimensional model to be tested and the three-dimensional reference model.

In the above embodiments, the at least one three-dimensional reference model stored in the database comprises a plurality of three-dimensional reference models;

the processor is configured to: calculate a similarity between each of the three-dimensional reference models and the three-dimensional model to be tested; and the defect distribution pattern of the semiconductor wafer to be tested is determined to be a defect distribution pattern indicated by the three-dimensional reference model corresponding to a highest similarity in response to the highest similarity among the obtained plurality of similarities being higher than a preset threshold.

In the above embodiments, the processor is further configured to:

establish the at least one three-dimensional reference model and store the established at least one three-dimensional reference model to the database.

In the above embodiments, the processor is further configured to:

obtain distribution maps of a plurality of semiconductor wafer samples;

establish a plurality of three-dimensional sample models based on defect distribution maps of the plurality of semiconductor wafer samples;

classify the plurality of three-dimensional sample models into at least one category according to a degree of similarity between the plurality of three-dimensional sample models, wherein the three-dimensional sample models included in a same category indicate a same defect distribution pattern; and select any one three-dimensional sample model in the same category as the three-dimensional reference model for that category.

In the above embodiments, the processor is further configured to:

mark the semiconductor wafer to be tested, and/or further analyzing the cause of the defect of the semiconductor wafer to be tested when it is determined that the defect distribution of the semiconductor wafer to be tested is a defect distribution pattern indicated by the at least one three-dimensional reference model.

As described above, according to the method and apparatus for analyzing a semiconductor wafer of the present invention, it is possible to intelligently identify different numbers of defects on different semiconductor wafers and exhibiting various distributions by three-dimensional modeling the defect map of the semiconductor wafer, and makes alarm interception or unified classification analysis possible in subsequent steps. Through the method and device provided by the invention, long-term effective monitoring and analysis of surface defects of the semiconductor wafer can be realized.

BRIEF DESCRIPTION OF THE DRAWINGS

FIGS. 3A-3D are diagrams showing defect distribution map of semiconductor wafers obtained in an embodiment of the present invention.

DETAILED DESCRIPTION

Figure 1:
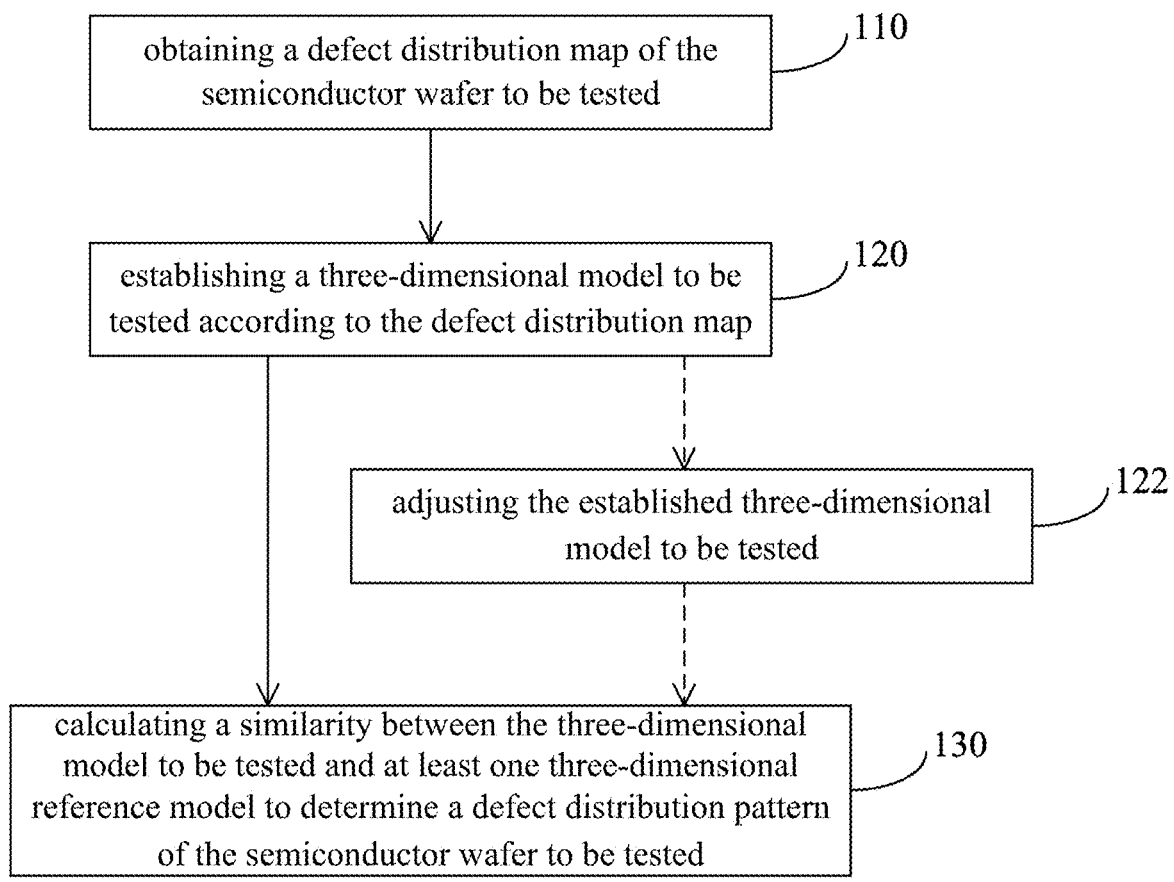
FIG. 1 shows a flow chart of a method of analyzing a semiconductor wafer provided by the present invention.

In the following detailed description, numerous specific details are set forth to provide a more thorough understanding of the present invention. However, it will be apparent to those skilled in the art that the present invention may be practiced without limitations from these specific details. In other words, well-known structures and devices are shown in a block diagram form and are not shown in detail to avoid obscuring the present invention.

The reader is cautioned as to all files and documents which are filed at the same time as this specification and which are open for the public to consult, and the contents of all such files and documents are incorporated herein by reference. Unless directly stated otherwise, all features disclosed in this specification (including any of the appended claims, the abstract, and the accompanying drawings) may be replaced by alternative features serving the same, equivalent, or similar purposes. Therefore, unless expressly stated otherwise, each of the features disclosed is only one example of a group of equivalent or similar features.

Note that when used, the flags left, right, front, back, top, bottom, front, back, clockwise, and counter-clockwise are used for convenience purposes only and do not imply any specific fixed direction. In fact, they are used to reflect the relative position and/or direction between various parts of an object.

As used herein, the terms "over . . . under . . . ", "between . . . and . . . ", and "on . . . " means the relative position of that layer relative to another layer. Likewise, for example, a layer that is deposited or placed over or under another layer may be in direct contact with another layer or there may be one or more intervening layers. In addition, a layer that is deposited or placed between layers may be in direct contact with the layers or there may be one or more intervening layers. In contrast, a first layer "on" a second layer is in contact with the second layer. In addition, a relative position of a layer relative to another layer is provided (assuming that film operations of deposition, modification, and removal are performed in relative to a starting substrate, without considering the absolute orientation of the substrate).

As mentioned in the background, for the defect detection in each node of the production process of large integrated circuit wafers, with the improvement of semiconductor technology level and process requirements, it is impossible to effectively screen out potential defect wafers by the prior art detection methods.

Therefore, there is a need for a method and apparatus that can efficiently screen out defective semiconductor wafers. Accordingly, the present invention provides a method and apparatus for analyzing a semiconductor wafer. According to the method and apparatus for analyzing a semiconductor wafer of the present invention, it is possible to intelligently identify different numbers of defects on different semiconductor wafers and exhibiting various distributions by three-dimensional modeling the defect map of the semiconductor wafer, and provides possible of alarm interception or unified classification analysis in subsequent steps. Through the method and device of the invention, long-term effective monitoring and analysis of surface defects of the semiconductor wafer can be realized.

The analysis method of the present invention is implemented as follows. Please refer to FIG. 1. FIG. 1 is a flow chart showing a method for analyzing a semiconductor wafer of the present invention. As shown in FIG. 1, the analysis method of the present invention includes at least step 110, obtaining a defect distribution map of the semiconductor wafer to be tested;

step 120: establishing a three-dimensional model to be tested according to the defect distribution map; and step 130: calculating a similarity between the three-dimensional model to be tested and at least one three-dimensional reference model to determine a defect distribution pattern of the semiconductor wafer to be tested.

Figure 2A:
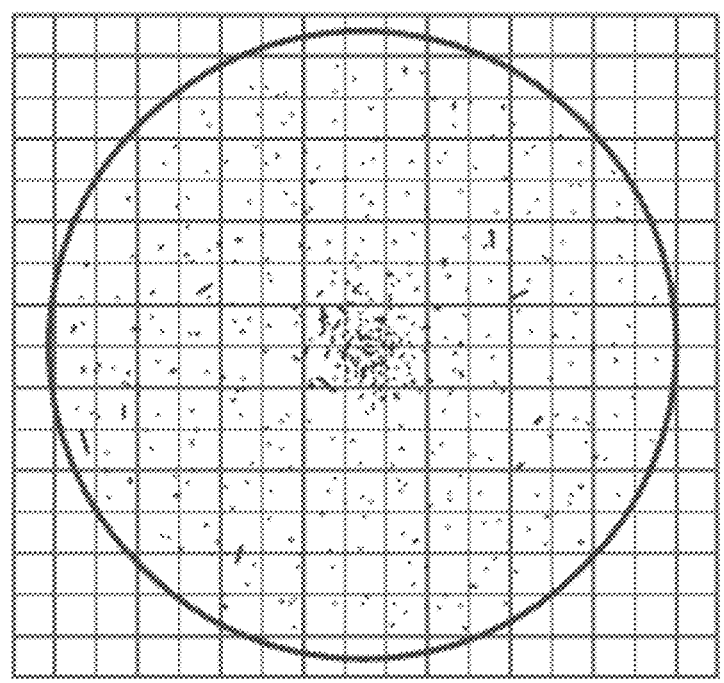
FIG. 2A shows a schematic diagram of a defect distribution map obtained by the present invention.

For step 110, specifically, please refer to FIG. 2A together. FIG. 2A shows a defect distribution map of the semiconductor wafer to be tested acquired after step 110. The defect distribution map indicates a defect distribution in the surface of the semiconductor wafer to be tested, and the defect distribution includes location information of the defect and quantity information of the defect. The above defect distribution map can be obtained by an optical/electrical scanning machine. Further, those skilled in the art should know how to obtain the above defect distribution map through an optical/electrical scanning machine, and details are not described herein again. It should be noted that the defect distribution map may be a defect distribution map obtained by scanning machines set at different process nodes of the entire wafer production line, to obtain semiconductor wafer defects of different process nodes for subsequent analysis.

Figure 2B:
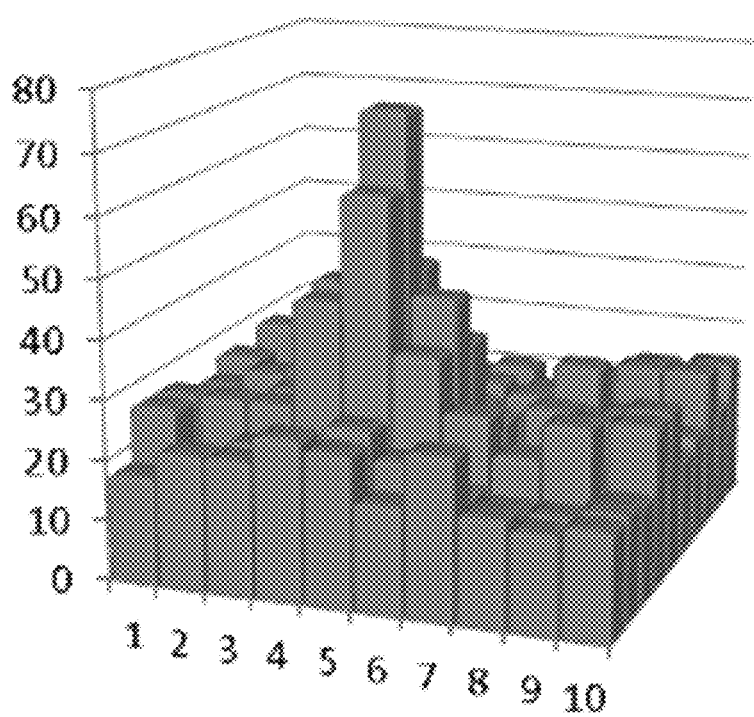
FIG. 2B shows the corresponding three-dimensional model to be tested established in accordance with the defect distribution map of FIG. 2A.

For step 120, please refer to FIG. 2B together. FIG. 2B shows a three-dimensional model to be tested established according to the defect distribution map shown in FIG. 2A. According to the defect distribution map of the semiconductor wafer to be tested acquired in step 110, the location information of the defects and the quantity information of the defects can be acquired. In step 120, firstly, the XY plane of the three-dimensional model to be tested is constructed by gridding the above defect distribution map, so that the XY plane of the three-dimensional model to be tested corresponds to the surface of the semiconductor wafer to be tested, and the Z-axis of the three-dimensional model to be tested is constructed by counting the number of defects located in the grid.

Further, in the defect distribution map and the three-dimensional model to be tested as shown in FIGS. 2A and 2B, the grid unit corresponds to a chip unit located on a semiconductor wafer. Those skilled in the art will appreciate that multiple repeating chip units are typically formed on a single semiconductor wafer, and when the defect distribution map is scanned, the defect quantity can be counted based on the chip unit on the semiconductor wafer as a basic repeating unit. It should be noted that the above embodiment in which the chip unit is a repeating unit as a grid unit is only an example of grid unit partitioning. In other embodiments provided by the present invention, the grid unit may also be transformed according to actual conditions, which will not be set forth herein.

Further, in the defect distribution map and the three-dimensional model to be tested as shown in FIGS. 2A and 2B, the Z-axis of the constructed three-dimensional model to be tested represents the number of defects located in the grid of the XY plane, in particular, represents the absolute number of above defects. Since the corresponding defect quantity information has been obtained in step 110, the Z-axis can be constructed by the absolute number of defects. It should be noted that the above embodiment of the Z-axis characterizing the absolute number of defects is only an example of characterizing the number of defects in the Z-axis. In other embodiments provided by the present invention, the number of defects may also be processed according to actual conditions, no longer described in this part.

For step 130, after obtaining the three-dimensional model to be tested as shown in FIG. 2B, by calculating the similarity between the three-dimensional model to be tested and the at least one three-dimensional reference model, the defect distribution pattern of the semiconductor wafer to be tested can be determined. The three-dimensional characterizing of defect map can be used to highlight the relevant features of the defects on the surface of the semiconductor wafer, to effectively and intuitively screen the defective semiconductor wafers.

Further, those skilled in the art should appreciate that the at least one three-dimensional reference model may include one or more three-dimensional reference models, wherein each three-dimensional reference model corresponds to a specific defect distribution pattern. In other words, the wording "three-dimensional reference model" is a three-dimensional model established based on a semiconductor wafer having a specific defect distribution pattern. The method for establishing the three-dimensional model may refer to step 110 and step 120, and details are not described herein again.

When only provided with one three-dimensional reference model, the similarity between the three-dimensional model to be tested and the three-dimensional reference model can be used to determine whether the semiconductor wafer to be tested has a defect distribution pattern corresponding to the three-dimensional reference model. If the similarity is higher than a predetermined threshold value, it indicates that the semiconductor wafer to be tested has this defect distribution pattern, and therefore can be marked, alarmed, etc., so that this defective wafer is screened out. Further, this type of defect can also be analyzed by analyzing the cause of the defect on the defective wafer.

When a plurality of three-dimensional reference models are provided, a plurality of similarity values may be obtained by separately calculating the similarity between each of the three-dimensional reference models and the three-dimensional model to be tested. In response to one of the similarity values being higher than the preset threshold, the defect distribution pattern of the semiconductor wafer to be tested is a defect distribution pattern corresponding to the three-dimensional reference model whose similarity value is higher than the preset threshold. Therefore, the semiconductor wafer to be tested can be marked, alarmed, etc., so that the defective wafer is screened out. Further, this type of defect can also be analyzed by analyzing the cause of the defect on the defective wafer.

Further, the at least one three-dimensional reference model may be pre-stored in a database. When it is determined that the similarity between the three-dimensional model to be tested and each of the at least one three-dimensional reference model provided is lower than the preset threshold, the three-dimensional model to be tested has a defect distribution which is not an existing defect distribution pattern. In this regard, it can be optimistically considered that the semiconductor wafer to be tested characterized by the three-dimensional model to be tested does not have defects beyond the standard, and the three-dimensional model to be tested can be stored in the above database in order to complete the above three-dimensional reference model.

Further, in an embodiment, the method for analyzing a semiconductor wafer of the present invention further includes establishing the at least one three-dimensional reference model. Specifically, the defect distribution maps of the plurality of semiconductor wafer samples are obtained first, and a person skilled in the art can obtain the defect distribution maps by referring to the foregoing method, which would not described here any longer. A plurality of three-dimensional sample models are established based on the defect distribution maps of the plurality of semiconductor wafer samples, and a person skilled in the art may refer to the foregoing method to establish a three-dimensional model according to the defect distribution map, which would not be described here any longer. The plurality of three-dimensional sample models are classified into at least one category according to the degree of similarity between the plurality of three-dimensional sample models, and the three-dimensional sample models included in one same category indicate a same defect distribution pattern; and any one three-dimensional sample model in the same category is selected as a three-dimensional reference model of this category.

Those skilled in the art will appreciate that the degree of similarity between a plurality of three-dimensional sample models can be calculated by various existing or future methods, for example, by correlation calculations, etc.

By acquiring a large number of defect maps of semiconductor wafers, a large number of defect three-dimensional models are constructed, and at least one three-dimensional reference model can be obtained by similarity classification. Moreover, as described above, by using the above method, for each three-dimensional model to be tested, if it does not have a defect distribution pattern corresponding to any one of the existing at least one three-dimensional reference model, the three-dimensional model to be tested can be stored as a three-dimensional sample model into the database to continuously improve the three-dimensional reference model.

According to the above method, the 24-hour uninterrupted intelligent identification interception can be realized, which can greatly reduce the labor cost and improve the accuracy and timeliness of the interception early warning, and is more suitable for the increasingly advanced and complicated integrated circuit production line yield monitoring.

As shown in FIG. 1, in another embodiment, the analysis method of the present invention may further include step 122, adjusting the established three-dimensional model to be tested. Further, in step 130, the similarity between the adjusted three-dimensional model to be tested and the at least one three-dimensional reference model is calculated to determine a defect distribution pattern of the semiconductor wafer to be tested.

Further, in step 122, the adjusting the three-dimensional model to be tested may include:

Adjustment (1): normalizing the Z axis of the three-dimensional model to be tested;

Adjustment (2): performing a Fourier transform on the Z axis of the three-dimensional model to be tested;

Adjustment (3): repeatedly rotating the three-dimensional model to be tested around the Z axis by several angles; and Adjustment (4): re-gridding the XY plane of the three-dimensional model to be tested.

Please refer to FIGS. 3A-3D, FIGS. 4A-4D and FIGS. 5A-5D to understand the adjustments (1): normalizing the Z axis of the three-dimensional model to be tested; and adjustments (2): performing a Fourier transform on the Z axis of the three-dimensional model to be tested.

FIGS. 3A-3D illustrate defect distribution maps of four semiconductor wafers. As can be seen from FIGS. 3A-3D, semiconductor wafer of FIG. 3A has fewer defects, central portion of semiconductor wafer of FIG. 3D has a very dense defect, while central portion of the semiconductor wafer of FIG. 3B, FIG. 3C has defects between the foregoing two semiconductor wafers. If only the defect number threshold is used according to the existing technology, it is not determined that the defect distributions of the semiconductor wafers of FIGS. 3A-3D are the same defect.

Figure 4A:
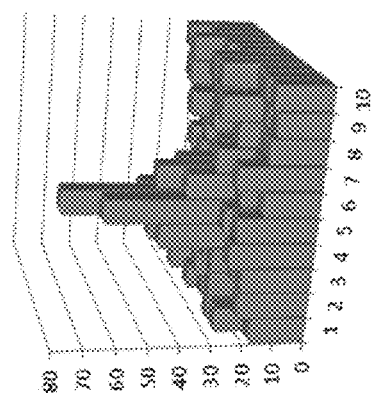
FIGS. 4A-4D illustrate corresponding three-dimensional models to be tested established in accordance with the defect distribution map of FIGS. 3A-3D.
Figure 4B:
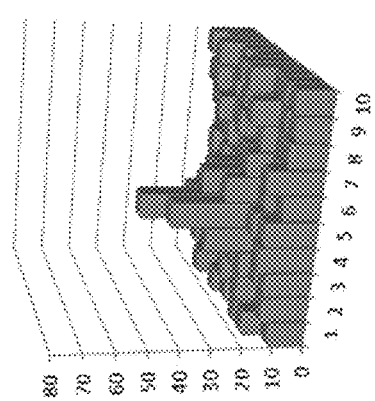
Figure 4C:
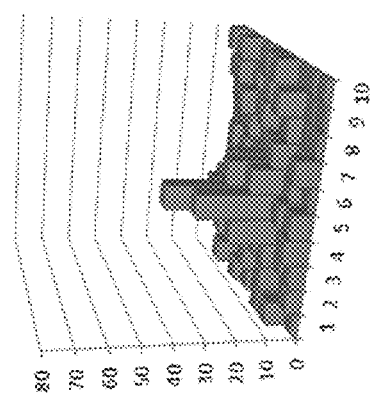
Figure 4D:
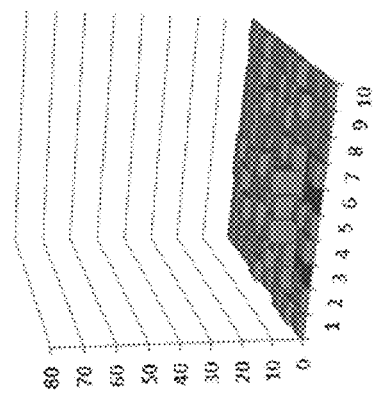
Figure 5D:
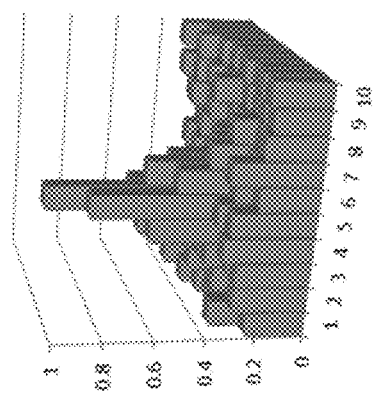
FIGS. 5A-5D illustrate three-dimensional models to be tested obtained by adjusting the three-dimensional model to be tested illustrated in FIGS. 4A-4D.
Figure 5C:
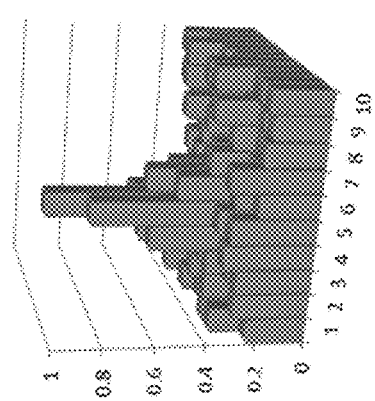
Figure 5B:
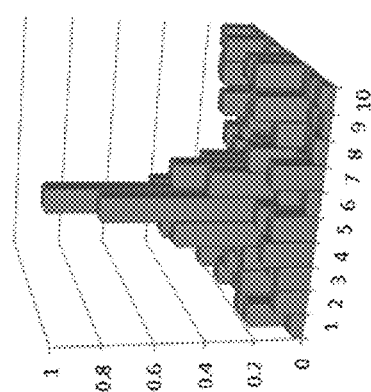
Figure 5A:
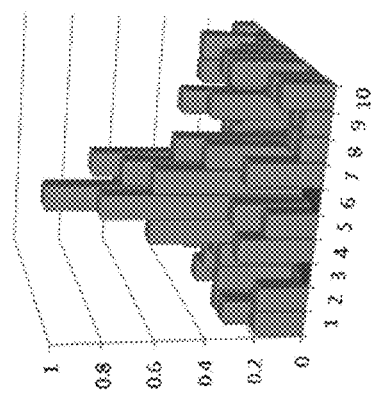

FIG. 4A-4D respectively illustrates three-dimensional defect models established in accordance with the defect distribution maps of FIGS. 3A-3D. In this step, the above three-dimensional defect model has not been adjusted. As can be seen from FIGS. 4A-4D, the similarities between FIGS. 4B-4D are apparent and can be considered as the same defect distribution. As such, by three-dimensionalizing the defect distribution map, it has been possible to more effectively screen out models whose original similarity is not apparent.

Further, in step 122, the method further comprises: performing adjustment (1) and adjustment (2) on the three-dimensional model to be tested shown in FIG. 4A-4D, and the adjusted three-dimensional model to be tested is as shown in FIG. 5A-5D. As can be seen from FIGS. 5A-5D, the similarity between the adjusted three-dimensional models to be tested shown in FIG. 5A-5D is very apparent.

In the above embodiment, the Z-axis of the three-dimensional model to be tested is normalized for the dimensionless processing means, so that the absolute value of the defect value becomes a relative value relationship. As can be seen from FIGS. 5A-5D, the coordinates of the Z-axis have changed from the original absolute number of defects to the ratio between 0-1. By the above normalization means, the defect distribution feature on the semiconductor wafer with fewer defects as shown in FIG. 3A can be enlarged, and therefore, defect distribution of the semiconductor wafer corresponding to FIG. 3A can be classified as the same type of defect distribution as FIGS. 3B-3D.

In the above embodiment, the Fourier transform is also performed on the Z axis of the three-dimensional model to be tested. The Fourier transform is performed to reduce noise, to ensure that the defects displayed in the three-dimensional model to be tested are the actual defects rather than the noise on the image. By the above-described embodiment, it is possible to effectively perform noise reduction processing on the semiconductor wafer with masses of defects as shown in FIG. 3D to eliminate interference.

Those skilled in the art should know that the above normalization processing and Fourier transform can be implemented by existing or future techniques and details are not described herein again.

By performing step 122 and adjusting the three-dimensional model to be tested, it is possible to effectively avoid the situation where the absolute number of defects is too small or too large to distinguish the defect distribution, so that the same type of defects can be efficiently identified and marked.

Please refer to FIGS. 6A-6C, FIGS. 7A-7C and FIGS. 8A-8C to understand the adjustment (3): repeatedly rotating the three-dimensional model to be tested around the Z axis by several angles.

Figure 6A:
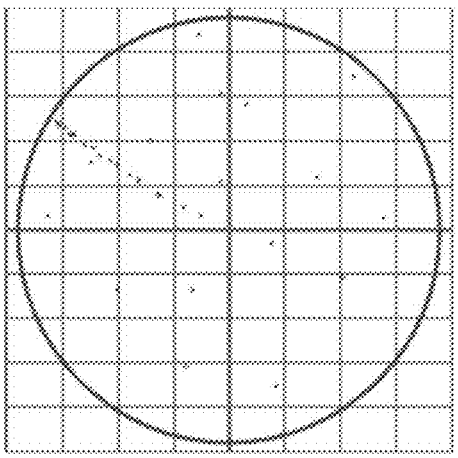
FIGS. 6A-6C are diagrams showing defect distribution map of semiconductor wafers obtained in another embodiment of the present invention.
Figure 6B:
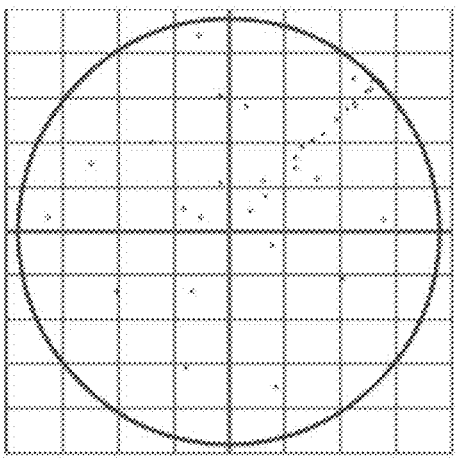
Figure 6C:
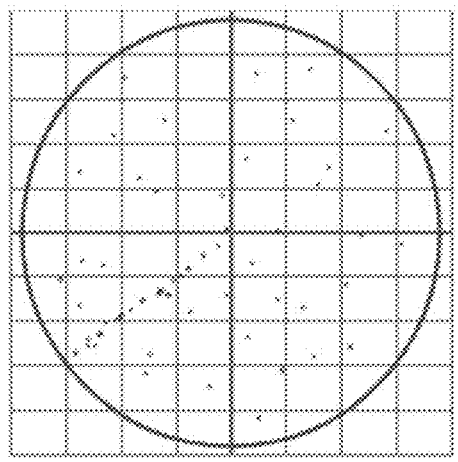

FIGS. 6A-6C respectively show defect distribution maps of three semiconductor wafers. As can be seen from FIGS. 6A-6C, although it is considered that the defects distributed on the semiconductor wafers are distributed along a certain radius by manual inspection, there is no way to classify the defect distribution of the above three semiconductor wafers into the same type by means of image recognition.

Figure 7C:
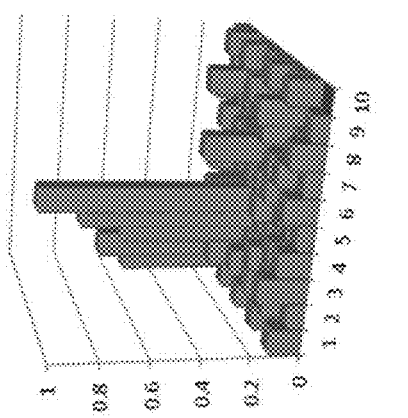
FIGS. 7A-7C illustrate corresponding three-dimensional models to be tested established in accordance with the defect distribution map of FIGS. 6A-6C.
Figure 7B:
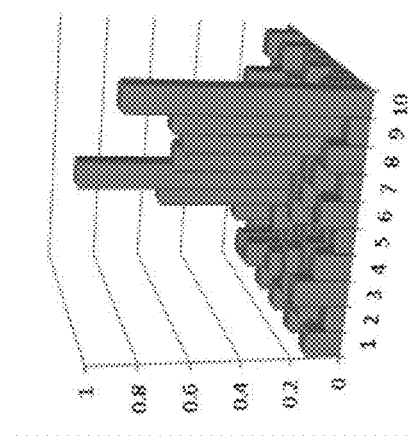
Figure 7A:
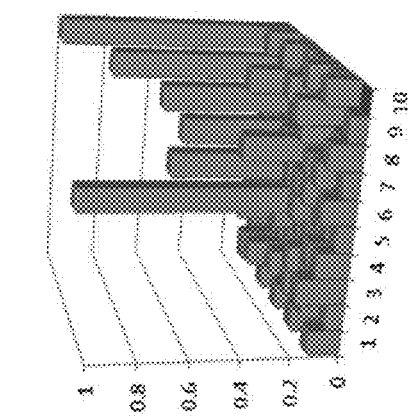

FIGS. 7A-7C respectively illustrates three-dimensional defect models established according to the defect distribution maps of FIGS. 6A-6C. In this step, the above three-dimensional defect model has not been adjusted, and the three-dimensional defect model can be performed with the adjustment (1) and adjustment (2) to make the model easier to distinguish. As can be seen from FIGS. 7A-7C, from the current point of view, these three three-dimensional defect models cannot be considered to be the same defect distribution.

Figure 8C:
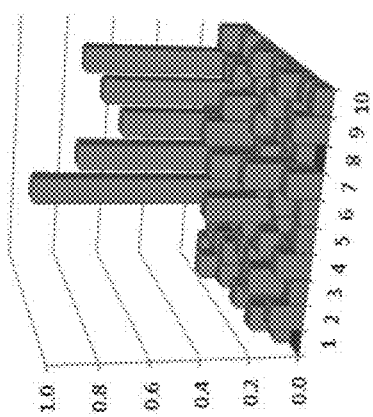
FIGS. 8A-8C illustrate three-dimensional models to be tested obtained by adjusting the three-dimensional model to be tested illustrated in FIGS. 7A-7C.
Figure 8B:
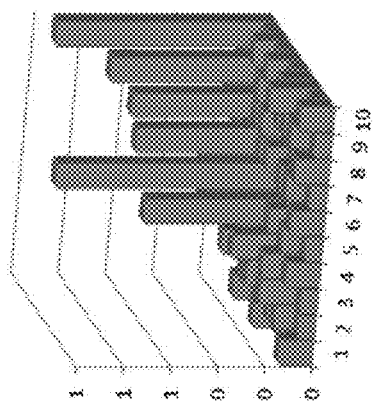
Figure 8A:
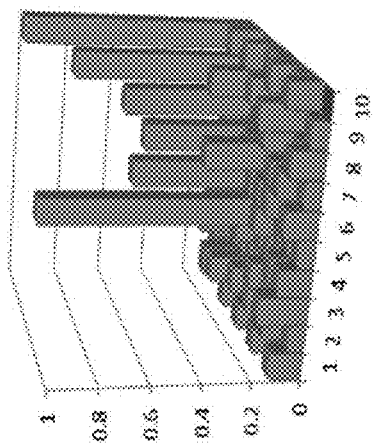

Therefore, further, in step 122, the three-dimensional model to be tested in FIGS. 7A-7C is further performed with the adjustment (3), and the adjusted three-dimensional model to be tested is as shown in FIGS. 8A-8C. As can be seen from FIGS. 8A-8C, the similarity between the three-dimensional models to be tested in FIGS. 8A-8C after adjustment is apparent.

In the above embodiment, the Z-axis of the three-dimensional model to be tested is repeatedly rotated by several angles, due to the existence of a special distributed defect wafer having a specific or non-specific angle difference. The above FIG. 7B is adjusted by rotating the three-dimensional defect model by 90° counterclockwise around the Z axis to obtain FIG. 8B. The above FIG. 7C is adjusted by rotating the three-dimensional defect model by 90° clockwise around the Z axis to obtain FIG. 8C. Those skilled in the art will appreciate that the above-described counterclockwise rotation of 90° or clockwise rotation of 90° is only an example of the result of repeated rotation of several angles. In the specific operation, a rotation angle may be preset in advance, and the three-dimensional model to be tested is repeatedly rotated by the above-mentioned preset angle, and the similarity between the three-dimensional model to be tested and the three-dimensional reference model is calculated after each rotation, and the highest degree of similarity is taken for the adjusted three-dimensional model to be tested.

By performing step 122, the three-dimensional model to be tested is adjusted, it is possible to effectively avoid the situation where the distribution of defects is not recognized due to specific or non-specific angular differences, so that the same type of defects can be efficiently identified and marked.

Please refer to FIGS. 9A-9C, FIGS. 10A-10C and FIGS. 11A-11C to understand the adjustments (4): re-gridding the XY plane of the three-dimensional model to be tested.

Figure 9C:
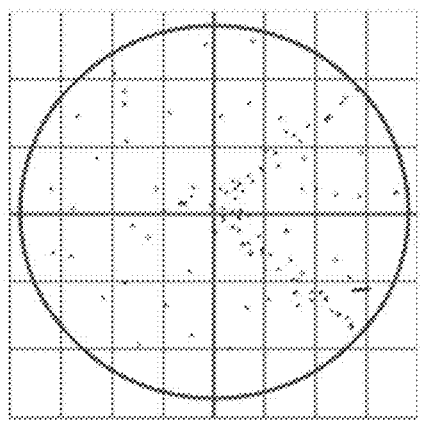
FIGS. 9A-9C are diagrams showing defect distribution map of semiconductor wafers obtained in another embodiment of the present invention.
Figure 9B:
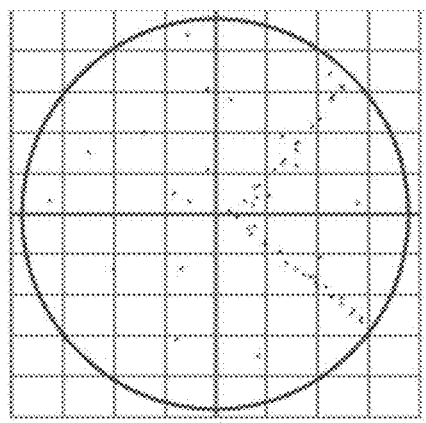
Figure 9A:
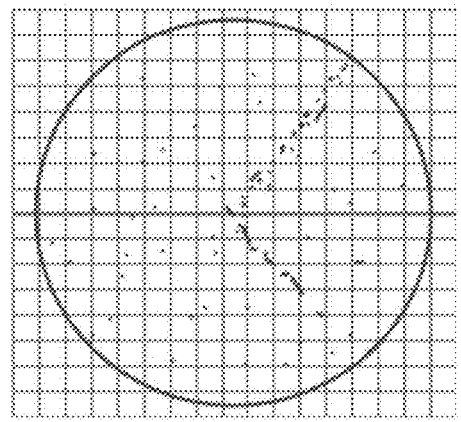

FIGS. 9A-9C respectively show defect distribution maps of three semiconductor wafers. As can be seen from FIGS. 9A-9C, although by manual inspection, it can be considered that the defects distributed on the semiconductor wafers are distributed in two certain radius along a certain angle, but by image recognition, due to the size mismatch between the three, there is no way to classify the defect distribution of the above three semiconductor wafers into the same kind.

Figure 10C:
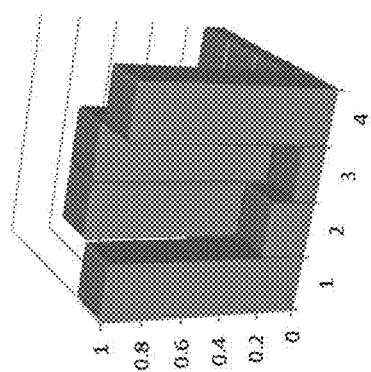
FIGS. 10A-10C illustrate corresponding three-dimensional models to be tested established in accordance with the defect distribution map of FIGS. 9A-9C.
Figure 10B:
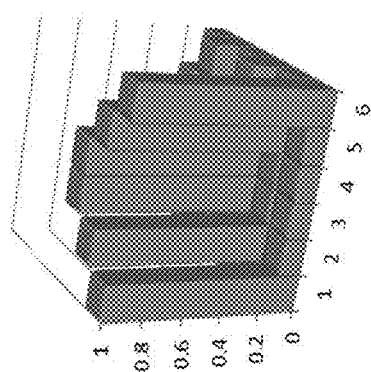
Figure 10A:
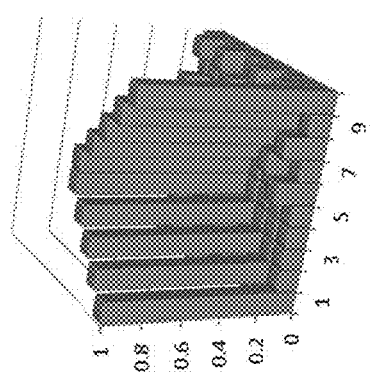

FIGS. 10A-10C respectively illustrates three-dimensional defect models established according to the defect distribution maps of FIGS. 9A-9C. In this step, the above three-dimensional defect model has not been adjusted, and the three-dimensional defect model can be performed with the adjustment (1), adjustment (2) and adjustment (3) to make the model easier to distinguish. As can be seen from FIGS. 10A-10C, these three three-dimensional defect models cannot be considered to be the same defect distribution due to the mismatch between the dimensions.

Figure 11A:
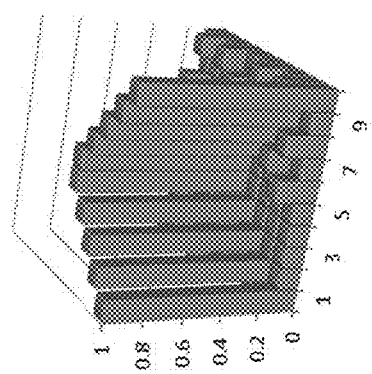
FIGS. 11A-11C illustrate three-dimensional models to be tested obtained by adjusting the three-dimensional model to be tested illustrated in FIGS. 10A-10C.
Figure 11B:
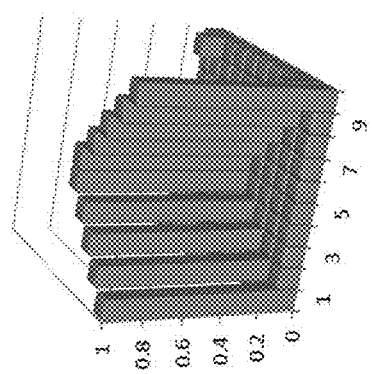
Figure 11C:
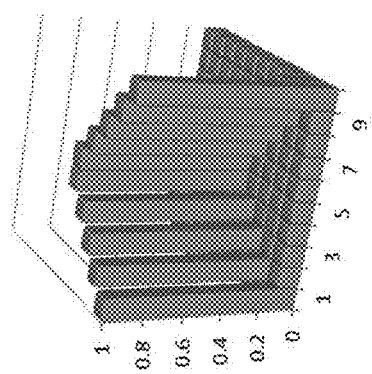

Therefore, further, in step 122, the three-dimensional model to be tested in FIGS. 10A-10C is further performed with the adjustment (4), and the adjusted three-dimensional model to be tested is as shown in FIGS. 11A-11C. As can be seen from FIGS. 11A-11C, the similarity between the three-dimensional models to be tested in FIGS. 11A-11C after adjustment is apparent.

In the above embodiment, the XY plane re-gridding of the three-dimensional model to be tested is for products having different chip design sizes or different wafer sizes. As described above, the grid cells in the XY plane of the three-dimensional model to be tested may be duplicate chip units on the corresponding wafer. Since the analysis method of the present invention can be applied to different process flows and process machines, there are cases wherein the sizes of the semiconductor wafers to be tested are the same but the sizes of the chip units are different, the sizes of the chip units are the same but the sizes of the semiconductor wafers are different, or the sizes of the semiconductor wafers and the sizes of the chip units are both different.

Therefore, the three-dimensional model to be tested needs to be adjusted to re-gridding the XY plane. The re-gridding is also a normalized embodiment, and finally, different sizes of wafers and chip units are characterized by XY planes with the same number of grid cells.

For example, it is preset that there are 4*4(16) grids in one XY plane, if there is a model whose number of original grids in the XY plane is 2*2(4), the adjusted three-dimensional defect model can be obtained by re-dividing the above 2*2 defect distribution into 4*4 and using this as the XY plane.

For example, the original 2*2 grid 1 (see Table 1 below) can be converted into a 4*4 grid 2 (see Table 2 below), where the numbers in the grid represent the number of defects located within the grid. Those skilled in the art should know that after adjusting the XY plane, it may also include adjusting the number of defects of the Z axis to obtain an optimal three-dimensional defect model.

TABLE 1

| 2 | 2 |
|---|---|
| 10 | 10 |

TABLE 2

| 1 | 0 | 0 | 0 |
|---|---|---|---|
| 0 | 1 | 1 | 1 |
| 1 | 4 | 4 | 1 |
| 4 | 1 | 0 | 5 |

By performing step 122, the three-dimensional model to be tested is adjusted, the defect distribution coordinates (X,Y) renormalized distributed in a two-dimensional coordinate system, which can effectively avoid the situation that the defect distribution map cannot be recognized by different wafer sizes, different chip sizes or different wafer and chip sizes, so that similar defects can be identified and marked efficiently.

So far, the specific implementation method of the analysis method of the semiconductor wafer provided by the present invention has been basically introduced. The present invention establishes a unified three-dimensional defect wafer model by using the wafer defect distribution information map obtained by the online defect scanning, and noise reduction processing, normalized fitting, rotation processing or XY plane normalization are performed to obtain a typical and clearly distinguishable special distributed defect wafer model, which avoids the situation that the traditional defect quantity threshold alarm and picture feature point recognition technology cannot identify the special distributed defect wafer with less defect degree or random defect background, to improve the accuracy and sensitivity of the system to intelligently identify special distributed defect wafers, and finally realizing the unified 3D model intelligent monitoring of the same type of special distributed defect wafers with different wafers with different chip sizes and different angles. Thereby the unified production process monitoring of multi-platform and multi-products of large integrated circuit production lines is improved and the yield is improved.

Figure 12:
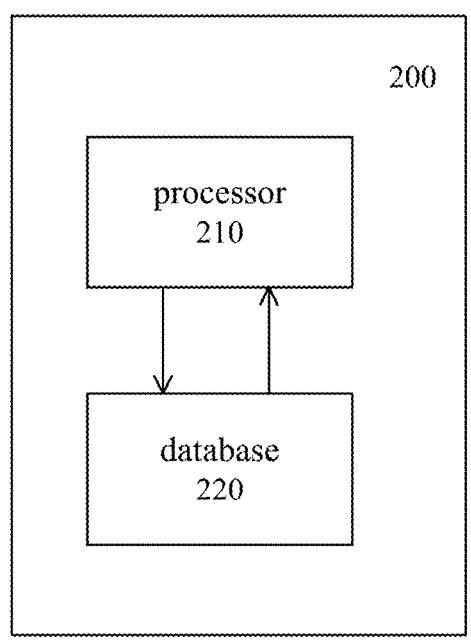
FIG. 12 is a schematic illustration of an apparatus for analyzing a semiconductor wafer provided by the present invention.

Still further, the present invention also provides an apparatus. As shown in FIG. 12, the apparatus 200 includes a processor 210 and a memory having a database 220 stored therein. The processor 210 is configured to implement the method for analyzing a semiconductor wafer provided by the present invention. For details, please refer to the specific implementation of the foregoing method, and details are not described herein again.

Further, the above database 220 stores various three-dimensional models including various reference models, models to be tested, and sample model big data. The processor 210 can retrieve the relevant data model from the database 220, and can also store the relevant data model in the database 220 to finally realize the unified 3D model intelligent monitoring of the same type of special distributed defect wafers in case of different wafers, different chip sizes, different angles differentials, and different defect numbers.

It will be further appreciated by a person skilled in the art that various illustrative logic blocks, modules, circuits, and algorithm steps described in conjunction with the embodiments disclosed herein can be implemented as electronic hardware, computer software, or a combination of both. In order to clearly illustrate the interchangeability between hardware and software, various illustrative components, frames, modules, circuits, and steps are generally described above in the form of functionalities thereof. Whether such functionalities are implemented as hardware or software is dependent on a specific application and design constrains imposed on the entire system. A person skilled could implement the described functionalities in different manners for each particular application, but this implementation decision should not be construed as resulting in departing from the scope of the present invention.

The various illustrative logic modules, and circuits described in connection with the embodiments disclosed herein may be general purpose processors, digital signal processors (DSPs), application specific integrated circuits (ASICs), field programmable gate arrays (FPGAs), or other programmable logic devices, discrete gate or transistor logic, discrete hardware components, or any combination thereof designed to perform the functions described herein are implemented or executed. A general purpose processor may be a microprocessor, but in the alternative, the processor may be any conventional processor, controller, microcontroller, or state machine. The processor may also be implemented as a combination of computing devices, such as a combination of a DSP and a microprocessor, a plurality of microprocessors, one or more microprocessors in conjunction with a DSP core, or any other such configuration.

The steps of a method or algorithm described in connection with the embodiments disclosed herein may be embodied in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor to enable the processor to read and write information to/from the storage medium. In the alternative, the storage medium can be integrated into the processor. The processor and the storage medium can reside in an ASIC. The ASIC can reside in the user terminal. In the alternative, the processor and the storage medium may reside as a discrete component in the user terminal.

In one or more exemplary embodiments, the described functions can be implemented in hardware, software, firmware or their any combination. If they are implemented as a computer program product in software, then various functions can be stored in a computer readable medium as one or more instructions or codes or transported via same. The computer readable medium comprises both a computer storage medium and a communication medium, and comprises any medium facilitating a computer program to transfer from one place to another. The storage medium can be any available medium that can be accessed by a computer. As an example but not limitation, such a computer readable medium can comprise RAM, ROM, EEPROM, CD-ROM or other optical disk storages, magnetic disk storages or other magnetic storage device, or any other medium that can be used for carrying or storing appropriate program codes in the form of instructions or data structures and can be accessed by a computer. Any connection is also rightly called a computer readable medium. For example, if the software is transported from a web site, a server, or other remote sources using a coaxial-cable, an optical fibre cable, a twisted pair, a digital subscriber line (DSL), or wireless techniques such as infrared, radio, and microwave or anything like that, then the coaxial-cable, the optical fibre cable, the twisted pair, the DSL, or the wireless techniques such as infrared, radio, microwave or anything like that are included in the definition of medium. Disks and discs as used herein comprise a compact disc (CD), a laser disc, an optical disc, a digital versatile disc (DVD), a floppy disk and a blue-ray disc, wherein the disks often reproduce data magnetically, and the discs optically reproduce data with laser. Combinations of the forgoing should also be included in the range of the computer readable medium.

The previous description of the present disclosure is provided to enable any one skilled in the art to make or use the present disclosure. In one embodiment, the present disclosure is not intended to be limited to the examples and designs described herein, but should be granted with the widest scope consistent with the principle and novelty features disclosed herein.

It is to be understood that this description is not intended to explain or limit the scope or meaning of the claims. In addition, in the detailed description above, it can be seen that various features are combined together in a single embodiment for the purpose of simplifying the disclosure. The method of the present disclosure should not be interpreted as reflecting the intention that the claimed embodiments require more features than those expressly listed in each claim. Rather, as reflected by the appended claims, an inventive subject matter lies in being less than all features of a single disclosed embodiment. Therefore, the appended claims are hereby incorporated into the detailed description, with each claim standing on its own as a separate embodiment.

One embodiment or embodiments mentioned in this description is/are intended to be, combined with a particular feature, structure, or characteristic described in the embodiment, included in at least one embodiment of a circuit or method. The appearances of phrases in various places in the specification are not necessarily all referring to a same embodiment.

What is claimed is:

1. A method of analyzing a semiconductor wafer for analyzing a defect distribution pattern on a semiconductor wafer to be tested, the method comprising:
obtaining a defect distribution map of the semiconductor wafer to be tested, the defect distribution map indicating a defect distribution within a surface of the semiconductor wafer to be tested;

establishing a three-dimensional model to be tested according to the defect distribution map, wherein an XY plane of the three-dimensional model to be tested corresponds to the surface of the semiconductor wafer to be tested, and a Z-axis of the three-dimensional model to be tested corresponds to the number of defects in each grid unit in the XY plane; and calculating a similarity between the three-dimensional model to be tested and at least one three-dimensional reference model to determine a defect distribution pattern of the semiconductor wafer to be tested, wherein each three-dimensional reference model indicates a pattern of defect distribution;

adjusting the three-dimensional model to be tested to obtain an adjusted three-dimensional model to be tested comprising:

in response to the number of grid units of the XY plane of the three-dimensional model to be tested being inconsistent with the number of grid units of the XY plane of the at least one three-dimensional reference model, re-gridding the XY plane of the three-dimensional model to be tested according to the number of grid units of the XY plane of the at least one three-dimensional reference model to obtain the XY plane adjusted three-dimensional model to be tested; and calculating the similarity further comprises calculating a similarity between the adjusted three-dimensional model to be tested and the at least one three-dimensional reference model to determine the defect distribution pattern of the semiconductor wafer to be tested.

2. The method of claim 1, wherein the adjusting the three-dimensional model to be tested further comprises: normalizing the number of defects in each grid unit in the XY plane to obtain the Z-axis adjusted three-dimensional model to be tested.

3. The method of claim 1, wherein the adjusting the three-dimensional model to be tested further comprises: Fourier transforming the number of defects in each grid unit in the XY plane to obtain the Z-axis adjusted three-dimensional model to be tested.

4. The method of claim 1, wherein the adjusting the three-dimensional model to be tested further comprises: rotating the three-dimensional model to be tested multiple times around the Z-axis;

the computing further comprises, for each of the at least one three-dimensional reference model, calculating the similarity between the three-dimensional reference model and the three-dimensional model to be tested after each rotation, wherein the highest similarity is the similarity between the three-dimensional model to be tested and the three-dimensional reference model.

5. The method of claim 1, wherein the at least one three-dimensional reference model comprises a plurality of initial three-dimensional reference models; the method further comprising:

calculating a similarity between each of the plurality of initial three-dimensional reference models and the three-dimensional model to be tested; and the defect distribution pattern of the semiconductor wafer to be tested is determined to be a defect distribution pattern indicated by the initial three-dimensional reference model corresponding to a highest similarity in response to the highest similarity among the obtained plurality of similarities being higher than a preset threshold.

6. The method of claim 1 further comprising: establishing the at least one three-dimensional reference model.

7. The method of claim 6 wherein the establishing further comprises:

obtaining distribution maps of a plurality of semiconductor wafer samples;

establishing a plurality of three-dimensional sample models based on defect distribution maps of the plurality of semiconductor wafer samples;

classifying the plurality of three-dimensional sample models into at least one category according to a degree of similarity between the plurality of three-dimensional sample models, and the three-dimensional sample models included in a same category indicate a same defect distribution pattern; and selecting any one three-dimensional sample model in the same category as the three-dimensional reference model for that category.

8. The method of claim 1, wherein, when it is determined that the defect distribution of the semiconductor wafer to be tested is a defect distribution pattern indicated by the at least one three-dimensional reference model, the method further comprising:

marking the semiconductor wafer to be tested, and/or further analyzing the cause of the defect of the semiconductor wafer to be tested.

9. An apparatus for analyzing a semiconductor wafer for performing a method of analyzing a semiconductor wafer for analyzing a defect distribution pattern on a semiconductor wafer to be tested, the apparatus comprising:

a processor and a memory;

wherein at least one three-dimensional reference model is stored in a database on the memory, and each three-dimensional reference model indicates a pattern of defect distribution;

wherein the processor is configured to:

obtain a defect distribution map of the semiconductor wafer to be tested, the defect distribution map indicating a defect distribution within a surface of the semiconductor wafer to be tested;

establish a three-dimensional model to be tested according to the defect distribution map, wherein an XY plane of the three-dimensional model to be tested corresponds to the surface of the semiconductor wafer to be tested, and a Z-axis of the three-dimensional model to be tested corresponds to the number of defects in each grid unit in the XY plane; and calculate a similarity between the three-dimensional model to be tested and the at least one three-dimensional reference model to determine a defect distribution pattern of the semiconductor wafer to be tested;

adjust the three-dimensional model to be tested to obtain an adjusted three-dimensional model to be tested;

calculate a similarity between the adjusted three-dimensional model to be tested and the at least one three-dimensional reference model to determine the defect distribution pattern of the semiconductor wafer to be tested;

rotate the three-dimensional model to be tested multiple times around the Z-axis;

for each of the at least one three-dimensional reference model, calculate the similarity between the three-dimensional reference model and the three-dimensional model to be tested after each rotation, wherein the highest similarity is the similarity between the three-dimensional model to be tested and the three-dimensional reference model.

10. The apparatus of claim 9, wherein the processor is further configured to: normalize the number of defects in each grid unit in the XY plane to obtain the Z-axis adjusted three-dimensional model to be tested.

11. The apparatus of claim 9, wherein the processor is further configured to: Fourier transform the number of defects in each grid unit in the XY plane to obtain the Z-axis adjusted three-dimensional model to be tested.

12. The apparatus of claim 9, wherein the processor is further configured to:
in response to the number of grid units of the XY plane of the three-dimensional model to be tested being inconsistent with the number of grid units of the XY plane of the at least one three-dimensional reference model, re-grid the XY plane of the three-dimensional model to be tested according to the number of grid units of the XY plane of the at least one three-dimensional reference model to obtain the XY plane adjusted three-dimensional model to be tested.

13. The apparatus of claim 9, wherein the at least one three-dimensional reference model stored in the database comprises a plurality of initial three-dimensional reference models;
the processor is configured to: calculate a similarity between each of the plurality of initial three-dimensional reference models and the three-dimensional model to be tested; and
the defect distribution pattern of the semiconductor wafer to be tested is determined to be a defect distribution pattern indicated by the initial three-dimensional reference model corresponding to a highest similarity in response to the highest similarity among the obtained plurality of similarities being higher than a preset threshold.

14. The apparatus of claim 9 wherein the processor is further configured to:
establish the at least one three-dimensional reference model and store the established at least one three-dimensional reference model to the database.

15. The apparatus of claim 14, wherein the processor is further configured to:
obtain distribution maps of a plurality of semiconductor wafer samples;
establish a plurality of three-dimensional sample models based on defect distribution maps of the plurality of semiconductor wafer samples;
classify the plurality of three-dimensional sample models into at least one category according to a degree of similarity between the plurality of three-dimensional sample models, wherein the three-dimensional sample models included in a same category indicate a same defect distribution pattern; and
select any one three-dimensional sample model in the same category as the three-dimensional reference model for that category.

16. The apparatus of claim 9, wherein the processor is further configured to:
mark the semiconductor wafer to be tested, and/or further analyzing the cause of the defect of the semiconductor wafer to be tested when it is determined that the defect distribution of the semiconductor wafer to be tested is a defect distribution pattern indicated by the at least one three-dimensional reference model.

17. A method of analyzing a semiconductor wafer for analyzing a defect distribution pattern on a semiconductor wafer to be tested, the method comprising:
obtaining a defect distribution map of the semiconductor wafer to be tested, the defect distribution map indicating a defect distribution within a surface of the semiconductor wafer to be tested;
establishing a three-dimensional model to be tested according to the defect distribution map, wherein an XY plane of the three-dimensional model to be tested corresponds to the surface of the semiconductor wafer to be tested, and a Z-axis of the three-dimensional model to be tested corresponds to the number of defects in each grid unit in the XY plane, the XY plane being associated with a location of a defect within the surface of the semiconductor wafer to be tested, and the Z-axis being associated with an absolute number of defects; and
calculating a similarity between the three-dimensional model to be tested and at least one three-dimensional reference model to determine a defect distribution pattern of the semiconductor wafer to be tested, wherein each three-dimensional reference model indicates a pattern of defect distribution.

18. The method of claim 17 further comprising:
rotating the three-dimensional model to be tested multiple times around the Z-axis by a predetermined angle to adjust the three-dimensional model to be tested;
obtaining an adjusted three-dimensional model to be tested; and
calculating the similarity further comprises calculating a similarity between the adjusted three-dimensional model to be tested and the at least one three-dimensional reference model to determine the defect distribution pattern of the semiconductor wafer to be tested.

19. The method of claim 17 further comprising establishing the at least one three-dimensional reference model, comprising:
obtaining distribution maps of a plurality of semiconductor wafer samples;
establishing a plurality of three-dimensional sample models based on defect distribution maps of the plurality of semiconductor wafer samples;
classifying the plurality of three-dimensional sample models into at least one category according to a degree of similarity between the plurality of three-dimensional sample models, and the three-dimensional sample models included in a same category indicate a same defect distribution pattern; and
selecting any one three-dimensional sample model in the same category as the three-dimensional reference model for that category.

* * * * *